United States Patent
Wu

(10) Patent No.: US 10,261,239 B2
(45) Date of Patent: Apr. 16, 2019

(54) HOUSING STRUCTURE OF A BACKLIGHT MODULE, BACKLIGHT MODULE AND DISPLAY DEVICE

(71) Applicants: BOE TECHNOLOGY GROUP CO., LTD., Beijing (CN); Hefei BOE Display Lighting Co., Ltd., Anhui (CN)

(72) Inventor: Chunsheng Wu, Beijing (CN)

(73) Assignees: BOE TECHNOLOGY GROUP CO., LTD., Beijing (CN); HEFEI BOE DISPLAY LIGHTING CO., LTD., Anhui (CN)

( * ) Notice: Subject to any disclaimer, the term of this patent is extended or adjusted under 35 U.S.C. 154(b) by 0 days.

(21) Appl. No.: 15/986,032

(22) Filed: May 22, 2018

(65) Prior Publication Data

US 2019/0086607 A1   Mar. 21, 2019

(30) Foreign Application Priority Data

Sep. 21, 2017  (CN) .................... 2017 2 1219775 U

(51) Int. Cl.
| | |
|---|---|
| G02F 1/1333 | (2006.01) |
| G02F 1/1335 | (2006.01) |
| F21V 8/00 | (2006.01) |
| G02B 6/43 | (2006.01) |
| G02B 6/00 | (2006.01) |

(52) U.S. Cl.
CPC ............ *G02B 6/0088* (2013.01); *G02B 6/005* (2013.01); *G02B 6/0016* (2013.01); *G02B 6/0028* (2013.01); *G02B 6/0031* (2013.01); *G02F 1/133608* (2013.01); *G02F 2001/133314* (2013.01); *G02F 2001/133317* (2013.01); *G02F 2201/50* (2013.01)

(58) Field of Classification Search
CPC ........ G02F 2001/133317; G02F 2001/133314; G02F 1/133608
See application file for complete search history.

(56) References Cited

U.S. PATENT DOCUMENTS

| | | | | |
|---|---|---|---|---|
| 2004/0141102 | A1* | 7/2004 | Lin ................... | G02F 1/133308 349/58 |
| 2007/0064378 | A1* | 3/2007 | Lo ..................... | G02F 1/133308 361/679.22 |

(Continued)

FOREIGN PATENT DOCUMENTS

JP            2014115313 A   *  6/2014

*Primary Examiner* — Mariceli Santiago
(74) *Attorney, Agent, or Firm* — Calfee, Halter & Griswold LLP

(57) ABSTRACT

The present disclosure provides a housing structure of a backlight module, a backlight module and a display device. The housing structure of a backlight module includes a back plate and a plastic frame. The back plate includes a bottom plate, a first sidewall extending perpendicularly from one side of the bottom plate, and a first engaging portion disposed on the first sidewall. The plastic frame includes a second sidewall, a slot disposed on the second sidewall, and a second engaging portion disposed on a side surface of the slot. The slot is elastically deformable by a force. The first sidewall can be clamped in the slot. The first engaging portion can be engaged with the second engaging portion.

11 Claims, 4 Drawing Sheets

(56) References Cited

U.S. PATENT DOCUMENTS

2010/0171897 A1\* 7/2010 Yun .................. G02F 1/133605
                                                              349/58
2013/0321739 A1\* 12/2013 Cheng .................... G09F 13/04
                                                              349/58
2017/0205657 A1\* 7/2017 Xu .................... G02F 1/133308

\* cited by examiner

HOUSING STRUCTURE OF A BACKLIGHT MODULE, BACKLIGHT MODULE AND DISPLAY DEVICE

CROSS REFERENCE

This application is based upon and claims priority to Chinese Patent Application No. 201721219775.3, filed on Sep. 21, 2017, the entire contents thereof are incorporated herein by reference.

TECHNICAL FIELD

The present disclosure relates to a technical field of a display device, and in particular to a housing structure of a backlight module, a backlight module, and a display device.

BACKGROUND

In the related art, the backlight module generally includes a back plate 01, a plastic frame 02 connected with the back plate 01, a reflective sheet 03, a light guide plate 04, and an optical membrane kit 05 which are disposed in turn on the back plate 01, as shown in FIG. 1. Wherein the back plate 01 and the plastic frame 02 are connected generally in a clamping manner. Specifically, referring to FIG. 1, the plastic frame 02 has a convex hook 021 extending outwardly, and a slot 011 is opened at a place where the back plate 01 corresponds to the hook 021 of the plastic frame 02. When intended to be engaged, the hook 021 of the plastic frame 02 can fall into the slot 011 of the back plate 01, and the hook 021 of the plastic frame 02 can hook a side edge wall of the back plate 01, so as to achieve an object of fixing the plastic frame 02.

However, in the actual production process, this one-time engaging method may easily cause a problem that the plastic frame and the back plate are not engaged firmly. At the same time, due to limitations of the existing manufacturing process of the plastic frame 02 and the back plate 01, there is a larger tolerance range between a size of the slot 011 of the back plate 01 and a size of the hook 021 of the plastic frame 02. When the size of the hook 021 of the plastic frame 02 and the size of the slot 011 of the back plate 01 are not matched, poor engagement such as a difficult engagement or virtual engagement will occur, so as to reduce a yield of the backlight module and increase waste of various materials during rework.

SUMMARY

An embodiment of the present disclosure provides a housing structure of a backlight module, a backlight module and a display device, which can solve a problem that the plastic frame is not engaged with the back plate firmly in the related art.

To achieve above object, the embodiment of the present disclosure employs following technical solutions:

On one aspect, the embodiment of the present disclosure provides a housing structure of a backlight module, including a back plate and a plastic frame. The back plate includes a bottom plate, a first sidewall extending perpendicularly from one side of the bottom plate, and a first engaging portion disposed on the first sidewall. The plastic frame, which comprises a second sidewall, a slot disposed on the second sidewall, and a second engaging portion disposed on a side surface of the slot. The slot is elastically deformable by a force; the first sidewall can be clamped in the slot; and the first engaging portion can be engaged with the second engaging portion.

Optionally, the second sidewall includes an inner sidewall and an outer sidewall. The slot is formed between the inner sidewall and the outer sidewall. The outer sidewall is connected to the inner sidewall at one end and has an opening at the other end. The first sidewall can protrude into and be clamped within the slot via the opening.

Optionally, the first engaging portion is a groove, and the second engaging portion is a protrusion.

Optionally, the groove is a through groove. The slot has a first side surface and a second side surface that are opposite to each other. The protrusion is disposed on the first side surface, and is in contact with the second side surface.

Optionally, the back plate comprises four first sidewalls that enclose a circle. The groove is provided on each of the first sidewalls. The protrusion is provided on a position of the second sidewall corresponding to the groove.

Optionally, the second side surface has a recess portion that cooperates with the protrusion.

Optionally, the surface of the protrusion is a smooth curved surface.

Optionally, the groove is a rectangular groove.

Optionally, in the case that the first sidewall is clamped in the slot, a width of the top portion of the slot is greater than a width of the remaining portions of the slot.

On another aspect, the embodiment of the present disclosure provides a backlight module, including any one of the housing structures of the backlight modules as above described.

On a further aspect, the embodiment of the present disclosure provides a display device, including any one of the backlight modules as above described.

BRIEF DESCRIPTION OF THE DRAWINGS

In order to clarify technical aspects in embodiments of the present disclosure more clearly, drawings which are needed for the description of the embodiments are briefly described hereinafter. It will be apparent that the drawings in the following description are merely some embodiments of the present disclosure. Other drawings may be obtained according to these drawings by those skilled in the art, without creative labor.

DETAILED DESCRIPTION

Figure 1:
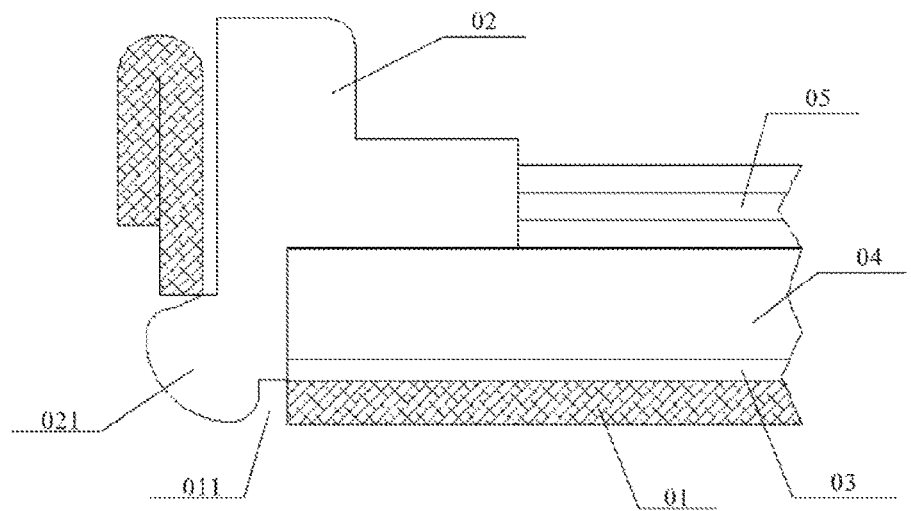
FIG. 1 is a schematic structural view of a backlight module as provided by the related art.

Hereinafter, the technical solutions in the embodiments of the present disclosure will be described clearly and completely in conjunction with the accompanying drawings. Apparently, the aforesaid embodiments are merely some but not all of the embodiments of the present disclosure. Based on the embodiments of the present disclosure, all other embodiments obtained by an ordinary person skilled in the art without creative efforts shall fall within the protection scope of the present disclosure.

An embodiment of the present disclosure provides a housing structure of a backlight module. As shown in FIG. 2 to FIG. 12, the backlight module includes a back plate 11 and a plastic frame 12. The back plate 11 includes a bottom plate 111, a first sidewall 112 that extends perpendicularly from one side of the bottom plate 111, and a first engaging portion 113 disposed on the first sidewall 112. The plastic frame 12 includes a second sidewall 121, a slot 122 that is disposed on the second sidewall 121, and a second engaging portion 123 that is disposed on a side surface of the slot 122.

The slot 122 is elastically deformable by a force. The first sidewall 112 can be clamped in the slot 122. And the first engaging portion 113 can be engaged with the second engaging portion 123.

Figure 2:
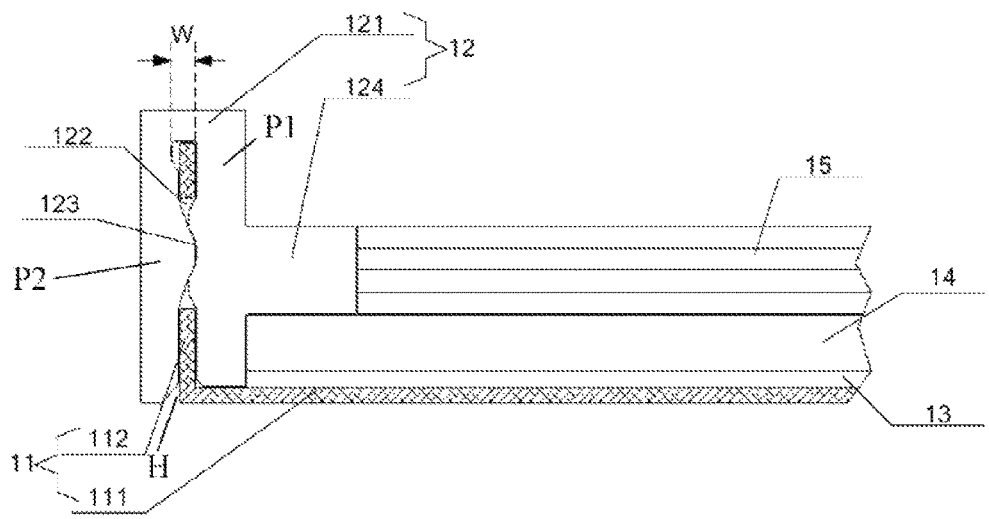
FIG. 2 is a schematic structural view of a backlight module as provided by an embodiment of the present disclosure.

As shown in FIG. 2, the plastic frame 12 generally further includes a protrusion 124 that is disposed on an inner surface of the second sidewall 121 and perpendicular to the second sidewall 121.

Wherein the second sidewall 121 includes an inner sidewall P1 and an outer sidewall P2. The slot 122 is formed between the inner sidewall P1 and the outer sidewall P2. The outer sidewall P2 is connected to the inner sidewall P1 at one end and has an opening H at the other end. The first sidewall 112 can protrude into and be clamped within the slot 122 via the opening H.

Wherein the first engaging portion 113 and the second engaging portion 123 have various specific structures, illustratively, the first engaging portion 113 is a groove, the second engaging portion 123 is a protrusion; alternatively, the first engaging portion 113 is a protrusion, and the second engaging portion 123 is a groove. The embodiment of the present disclosure is not limited thereto.

Figure 7:
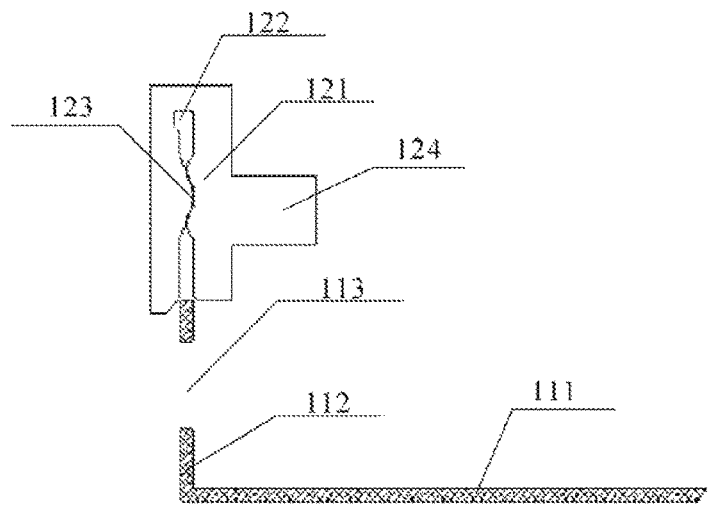
FIG. 7 is a first schematic view of a state in which the back plate and the plastic frame are engaged as provided by an embodiment of the present disclosure.
Figure 8:
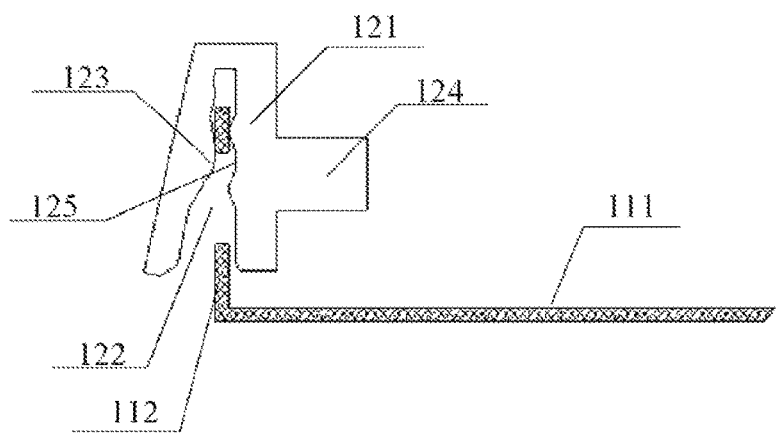
FIG. 8 is a second schematic view of a state in which the back plate and the plastic frame are engaged as provided by an embodiment of the present disclosure.

In a practical application, when the back plate 11 and the plastic frame 12 are engaged, a top end of the first sidewall 112 of the back plate 11 is firstly inserted into a bottom end of the slot 122 of the plastic frame 12, as shown in FIG. 7. Then, the top end of the plastic frame 12 is applied by a vertically downward force, such that during downward movement of the plastic frame 12, the slot 122 is elastically deformed due to insertion of the first sidewall 112, and thereby a width of the slot 122 becomes larger, as shown in FIG. 8. And then, the force is applied so that the first sidewall 112 is completely inserted into the slot 122, and the first engaging portion 113 on the first sidewall 112 is engaged with the second engaging portion 123 on the slot 122, till to the back plate 11 and the plastic frame 12 are engaged with each other, as shown in FIG. 9.

In this way, compared to the related art, according to the embodiment of the present disclosure, by providing the slot with the opening downwards on the second sidewall of the plastic frame, when the slot is applied by force to be deformed so that the first sidewall of the back plate is sandwiched in the slot of the plastic frame, the second engaging portion on the side surface of the slot is engaged with the first engaging portion of the first sidewall, and thereby realizing the engagement of the plastic frame and the back plate. Since a first engagement is achieved by the first sidewall of the back plate being clamped in the slot of the plastic frame, and a second engagement is achieved by the second engaging portion on the side surface of the slot being engaged with the first engaging portion on the first sidewall, such two engagements may make connection between the back plate and the plastic frame more stable, and also allow the first engaging portion and the second engaging portion to have a larger tolerance range, and thereby reducing the problem of poor engagement, and improve the yield of the backlight module.

Figure 9:
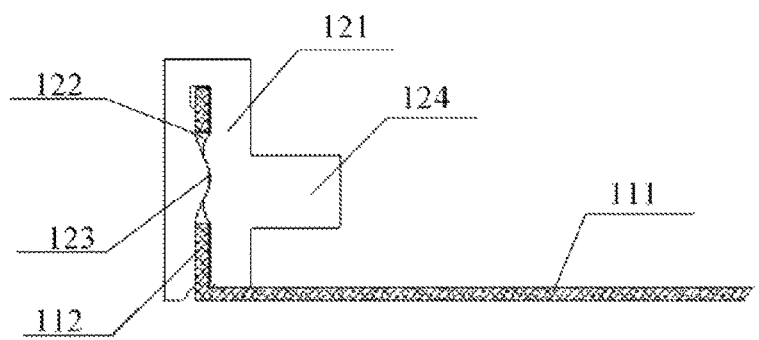
FIG. 9 is a third schematic view of a state in which the back plate and the plastic frame are engaged as provided by an embodiment of the present disclosure.
Figure 10:
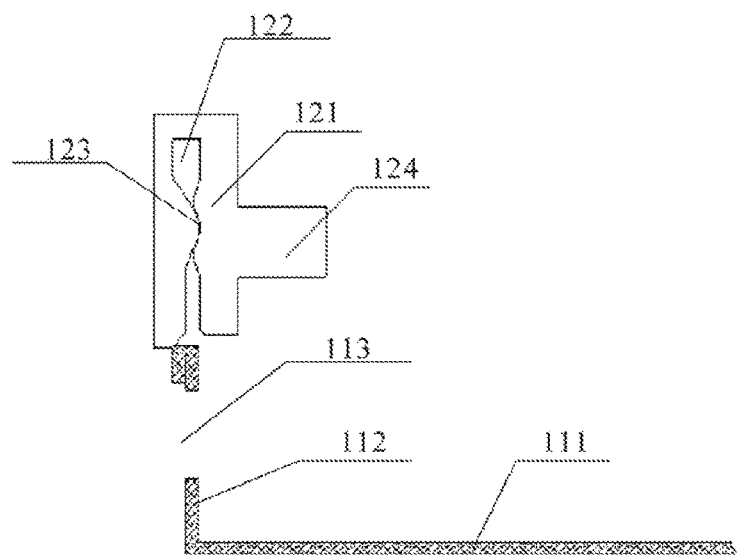
FIG. 10 is a fourth schematic view of a state in which the back plate and the plastic frame are engaged as provided by an embodiment of the present disclosure.
Figure 11:
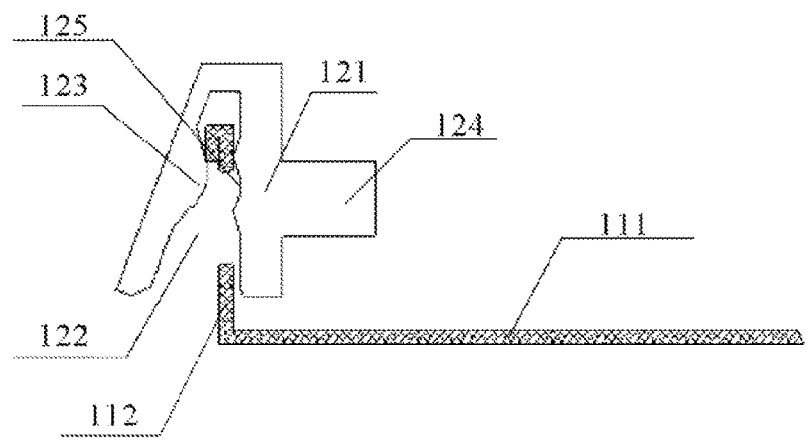
FIG. 11 is a fifth schematic view of a state in which the back plate and the plastic frame are engaged as provided by an embodiment of the present disclosure.
Figure 12:
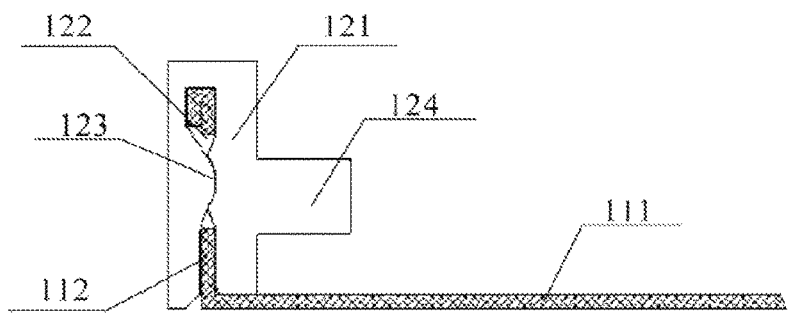
FIG. 12 is a sixth schematic view of a state in which the back plate and the plastic frame are engaged as provided by an embodiment of the present disclosure.

It should be noted that FIG. 7 to FIG. 9 are schematic structural views of a state in which the back plate 11 is engaged with the plastic frame 12 when the first sidewall 112 of the back plate 11 is thicker (i.e., the first sidewall 112 does not have a folded edge). FIG. 10 to FIG. 12 are schematic structural views of a state in which the back plate 11 is engaged with the plastic frame 12 when the first sidewall 112 of the back plate 11 is thinner (i.e., the first sidewall 112 has a folded edge). As a result of comparison, in order to allow the first sidewall 112 of the back plate 11 to be inserted into the slot 122 of the plastic frame 12, the upper part of the slot 122 of the corresponding plastic frame 12 is configured to be wider than the lower part thereof when the first sidewall 112 of the back plate 11 has the folded edge.

Further, referring to FIG. 2 to FIG. 12, for easy fabrication and also for convenience of engagement of the first engaging portion 113 and the second engaging portion 123, in practical applications, the first engaging portion 113 is generally fabricated as a groove; and the second engaging portion 123 is generally fabricated as a protrusion.

Preferably, the groove is a through groove. The slot 122 has a first side surface S1 and a second side surface S2 that are opposite to each other. The protrusion is disposed on the first side surface S1, and is in contact with the second side surface S2. As shown in FIG. 2, the groove on the first sidewall 112 is a through groove, so that the protrusion on the slot 122 may pass through the groove on the first sidewall 112, which may ensure that the slot 122 and the first sidewall 112 are engaged stably, and thereby the plastic frame 12 an the back plate 11 are engaged more stably.

Figure 5:
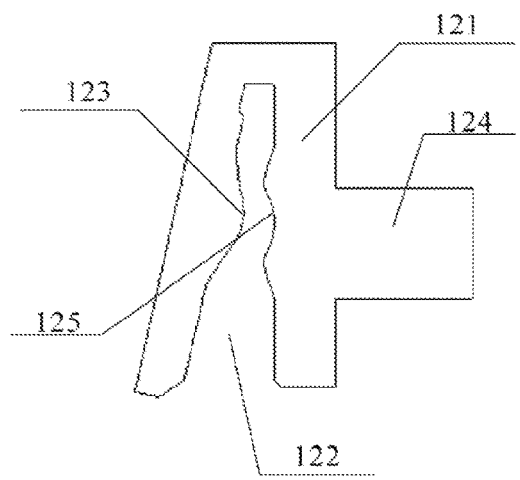
FIG. 5 is a first schematic structural view of a plastic frame as provided by an embodiment of the present disclosure.
Figure 6:
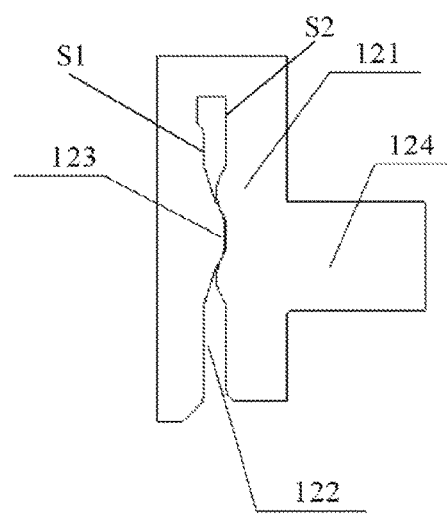
FIG. 6 is a second schematic structural view of a plastic frame as provided by an embodiment of the present disclosure.

Further, referring to FIG. 5 and FIG. 6, the second side surface has a recess portion 125 that cooperates with the protrusion, which may further improve stability of the engagement between the slot 122 and the first sidewall 112.

In practical applications, since the protrusion on the first side surface S1 of the slot 122 is in close contact with the recess portion 125 on the second side surface S2, and thereby there might be a problem that it is difficult to demold when an ordinary mold is used for direct injection molding, so that the plastic frame 12 is injection-molded into the structure as shown in FIG. 5 generally by means of the mold, and then the top end of the plastic frame 12 is locally heated, and cooled to form the structure as shown in FIG. 6.

The specific shapes and sizes of the protrusion are not defined in the embodiments of the present disclosure. For convenient fabrication and in order that the first sidewall 112 of the back plate 11 can be inserted into the slot 122 of the plastic frame 12 smoothly, in practical applications, the surface of the protrusion is generally configured as a smooth curved surface.

Figure 4:
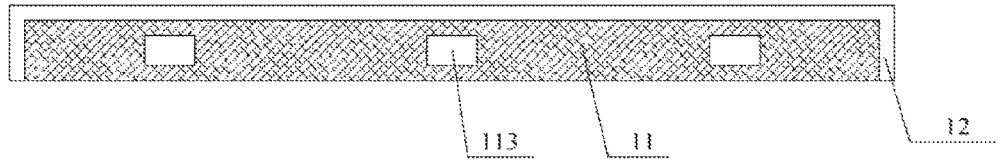
FIG. 4 is a second schematic structural view of a housing structure of the backlight module as provided by an embodiment of the present disclosure.

The groove may have various shapes, illustratively, may be a rectangular groove or an oval groove, which is not limited in this embodiment of the present disclosure. Referring to FIG. 4, the groove is generally configured as the rectangular groove for easy fabrication.

Further, referring to FIG. 2, in the case that the first sidewall 112 is clamped in the slot 122, a width W of the top portion of the slot 122 is greater than a width of the remaining portions of the slot 122, which may reduce force as desired to insert the first sidewall 112 of the back plate 11 into the slot 122 of the plastic frame 12, and also prevent the plastic frame 12 from being damaged due to application of excessive force.

Referring to FIG. 2, in the case that the first sidewall 112 clamped in the slot 122, the top portion of the slot 122 is in contact with the top portion of the first sidewall 112, which may make the engagement between the first sidewall 112 and the slot 122 more securely.

Wherein the second sidewall 121 is arranged to be corresponding to the first sidewall 112.

Figure 3:
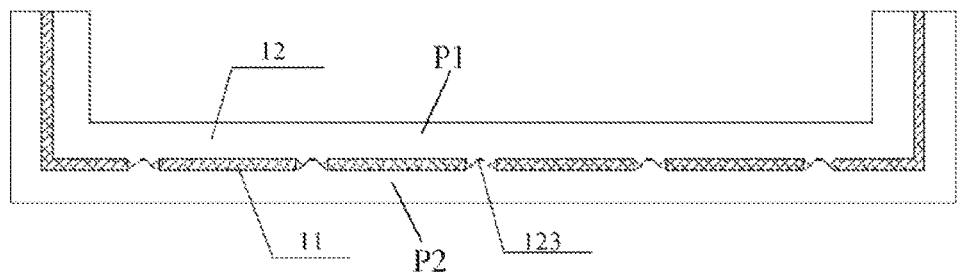
FIG. 3 is a first schematic structural view of a housing structure of the backlight module as provided by an embodiment of the present disclosure.

In practical applications, referring to FIG. 3, the back plate 11 includes four first sidewalls 112 that enclose a circle. The groove is provided on each of the first sidewalls 112. The protrusion is provided on a position of the second sidewall 121 corresponding to the groove. In this way, both the back plate 11 and the plastic frame 12 have an engaging structure in the four directions, and thusly the back plate 11 and the plastic frame 12 are engaged more stably.

Another embodiment of the present disclosure provides a backlight module, including the housing structure of the backlight module as above described. Referring to FIG. 2, the backlight module further includes a reflective sheet 13, a light guide plate 14, and an optical membrane kit 15 which are in turn disposed on the back plate 11. According to the embodiment of the present disclosure, by providing the slot 122 with the opening downwards on the second sidewall of the plastic frame, when the slot 122 is applied by force to be deformed so that the first sidewall 112 of the back plate 11 is clamped in the slot 122 of the plastic frame 12, the second engaging portion 123 on the side surface of the slot 122 is engaged with the first engaging portion 113 of the first sidewall 112, and thereby realizing the engagement of the plastic frame 12 and the back plate 11. Since a first engagement is achieved by the first sidewall 112 of the back plate 11 being clamped in the slot 122 of the plastic frame 12, and a second engagement is achieved by the second engaging portion 123 on the side surface of the slot 122 being engaged with the first engaging portion 113 on the first sidewall 112, such two engagements may make connection between the back plate 11 and the plastic frame 12 more stable, and also allow the first engaging portion 113 and the second engaging portion 123 to have a larger tolerance range, and thereby reducing the problem of poor engagement, and improve the yield of the backlight module.

A further embodiment of the present disclosure provides a display device, including any one of the aforesaid backlight modules. The plastic frame and the back plate in the backlight module are engaged in a manner of twice engagements, so that the connection between the back plate and the plastic frame is more stable. At the same time, such engagement allows relatively greater tolerances between the members, to reduce occurrence of poor engagement, so as to improve the yield of the backlight module.

In the housing structure of the backlight module, the backlight module and the display device as provided in the embodiments of the present disclosure, the housing structure of a backlight module includes the back plate and the plastic frame. The back plate includes the bottom plate and the first sidewall that is perpendicular to the bottom plate and extends to the upper side of the bottom plate. The plastic frame includes the second sidewall that encloses a circle. The cart slot is provided in the second side wall, and is applied by force to be elastically deformed. The first sidewall may be clamped in the slot. The first engaging portion is provided on the first sidewall. The second engaging portion is provided on the side surface of the slot on the second sidewall. The first engaging portion may be engaged with the second engaging portion. Compared with the related art, according to the embodiment of the present disclosure, by providing the slot with the opening downwards on the second sidewall of the plastic frame, when the slot is applied by force to be deformed so that the first sidewall of the back plate is clamped in the slot of the plastic frame, the second engaging portion on the side surface of the slot is engaged with the first engaging portion of the first sidewall, and thereby realizing the engagement of the plastic frame and the back plate. Since a first engagement is achieved by the first sidewall of the back plate being clamped in the slot of the plastic frame, and a second engagement is achieved by the second engaging portion on the side surface of the slot being engaged with the first engaging portion on the first sidewall, such two engagements may make connection between the back plate and the plastic frame more stable, and also allow the first engaging portion and the second engaging portion to have a larger tolerance range, and thereby reducing the problem of poor engagement, and improve the yield of the backlight module.

The present disclosure is described merely through aforesaid specific implementations, but the protection scope of the present disclosure is not limited thereto. Any person skilled in the art may easily think of variations or substitutions within the technical scope as disclosed in the present disclosure, which all should be contained within the scope of the disclosure. Therefore, the protection scope of the present disclosure should be determined depending on the protection scope of the claims.

What is claimed is:

1. A housing structure of a backlight module, wherein the housing structure comprises:
    a back plate, which comprises a bottom plate, a first sidewall extending perpendicularly from one side of the bottom plate, and a first engaging portion disposed on the first sidewall; and
    a plastic frame, which comprises a second sidewall, a slot disposed on the second sidewall, and a second engaging portion disposed on a side surface of the slot;
    the slot is elastically deformable by a force; the first sidewall is able to be clamped in the slot; and the first engaging portion is able to be engaged with the second engaging portion;
    wherein the first engaging portion is a groove, and the second engaging portion is a protrusion, the slot has a first side surface and a second side surface that are opposite to each other; the protrusion is disposed on the first side surface, and is in contact with the second side surface, the second side surface has a recess portion that cooperates with the protrusion, the protrusion is in close contact with the recess portion; and wherein a width of a top portion of the slot is greater than a width of remaining portions of the slot, in the case that the first sidewall is clamped in the slot, there is a gap in a width direction between the top portion of the slot and a top portion of the first sidewall.

2. The housing structure of the backlight module according to claim 1, wherein the second sidewall comprises an inner sidewall and an outer sidewall; the slot is formed between the inner sidewall and the outer sidewall; the outer sidewall is connected to the inner sidewall at one end and has an opening at the other end; and the first sidewall is able to protrude into and be clamped within the slot via the opening.

3. The housing structure of the backlight module according to claim 1, wherein the groove is a through groove.

4. The housing structure of the backlight module according to claim 3, wherein the surface of the protrusion is a smooth curved surface.

5. The housing structure of the backlight module according to claim 3, wherein the surface of the protrusion is a smooth curved surface.

6. The housing structure of the backlight module according to claim 3, wherein the groove is rectangular.

7. The housing structure of the backlight module according to claim 1, wherein the back plate comprises four first sidewalls that enclose a circle; the groove is provided on each of the first sidewalls; and the protrusion is provided on a position of the second sidewall corresponding to the groove.

8. The housing structure of the backlight module according to claim 1, wherein the surface of the protrusion is a smooth curved surface.

9. The housing structure of the backlight module according to claim 1, wherein the groove is rectangular.

10. A backlight module, wherein the backlight module comprises the housing structure of the backlight module according to claim 1.

11. A display device, wherein the display device comprises the backlight module according to claim 10.

* * * * *